(12) United States Patent
Kagerer et al.

(10) Patent No.: US 11,964,661 B2
(45) Date of Patent: Apr. 23, 2024

(54) DRIVER ASSISTANCE SYSTEM HAVING AN EMERGENCY STOPPING FUNCTION FOR A VEHICLE, VEHICLE HAVING SAID DRIVER ASSISTANCE SYSTEM, AND METHOD FOR THE EMERGENCY STOPPING OF A VEHICLE

(71) Applicant: Bayerische Motoren Werke Aktiengesellschaft, Munich (DE)

(72) Inventors: Walter Kagerer, Munich (DE); Sirin Toprak, Munich (DE); Soeren Ungermann, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 435 days.

(21) Appl. No.: 17/256,101

(22) PCT Filed: Jun. 24, 2019

(86) PCT No.: PCT/DE2019/100578
§ 371 (c)(1),
(2) Date: Dec. 24, 2020

(87) PCT Pub. No.: WO2020/001698
PCT Pub. Date: Jan. 2, 2020

(65) Prior Publication Data
US 2021/0269039 A1  Sep. 2, 2021

(30) Foreign Application Priority Data
Jun. 26, 2018  (DE) .................... 10 2018 210 410.7

(51) Int. Cl.
*B60W 30/18*  (2012.01)
*B60W 30/09*  (2012.01)
(Continued)

(52) U.S. Cl.
CPC ...... *B60W 30/18163* (2013.01); *B60W 30/09* (2013.01); *B60W 30/0956* (2013.01);
(Continued)

(58) Field of Classification Search
CPC ........... B60W 30/18163; B60W 30/09; B60W 30/0956; B60W 40/04; B60W 40/06;
(Continued)

(56) References Cited

U.S. PATENT DOCUMENTS 8,838,321 B1 * 9/2014 Ferguson ........... G01C 21/3415
340/901
2012/0101701 A1 * 4/2012 Moshchuk ............. G08G 1/166
701/70
(Continued)

FOREIGN PATENT DOCUMENTS

DE  10 2005 009 929 A1   9/2006
DE  10 2012 001 312 A1   8/2012
(Continued)

OTHER PUBLICATIONS

"Rechtsfolgen zunehmender Fahrzeugautomatisierung", Bundesanstalt fuer Strassenwesen (BASt) [German Federal Highway Research Institute], Forschung kompakt [Research News], Edition Nov. 2012 with English Abstract (two (2) pages).
(Continued)

*Primary Examiner* — Donald J Wallace
*Assistant Examiner* — Daniel M. Robert
(74) *Attorney, Agent, or Firm* — Crowell & Moring LLP

(57) ABSTRACT

A driver assistance system has an emergency stopping function for a motor vehicle. The driver assistance system is designed to perform an automated lane change from a first lane to a second lane when the emergency stopping function is triggered. The driver assistance system is further designed to determine at least one road characteristic and/or at least
(Continued)

one vehicle interior characteristic and, based on the determined at least one road characteristic and/or the vehicle interior characteristic, to decide whether to execute the lane change.

13 Claims, 2 Drawing Sheets

(51) Int. Cl.
*B60W 30/095* (2012.01)
*B60W 40/04* (2006.01)
*B60W 40/06* (2012.01)
*B60W 40/08* (2012.01)

(52) U.S. Cl.
CPC ............ *B60W 40/04* (2013.01); *B60W 40/06* (2013.01); *B60W 40/08* (2013.01); *B60W 2040/0881* (2013.01); *B60W 2540/227* (2020.02); *B60W 2552/05* (2020.02); *B60W 2552/10* (2020.02); *B60W 2555/60* (2020.02)

(58) Field of Classification Search
CPC ......... B60W 40/08; B60W 2040/0881; B60W 2540/227; B60W 2552/05; B60W 2552/10; B60W 2555/60; B60W 2540/00; B60W 50/0098; B60W 50/035; B60W 30/18109; B60W 40/072; B60K 28/06
See application file for complete search history.

(56) References Cited

U.S. PATENT DOCUMENTS

| | | | | |
|---|---|---|---|---|
| 2014/0114502 A1* | 4/2014 | Hugron | ................ | G07C 5/008 701/1 |
| 2015/0305675 A1* | 10/2015 | Miller | ................... | G16H 40/67 600/301 |
| 2016/0071418 A1* | 3/2016 | Oshida | ................... | B60K 28/06 701/23 |
| 2017/0147004 A1 | 5/2017 | Reichel et al. | | |
| 2017/0291602 A1* | 10/2017 | Newman | ............... | B60W 50/14 |
| 2017/0297567 A1 | 10/2017 | Matsumura | | |
| 2017/0316533 A1* | 11/2017 | Goldman-Shenhar | ...................... | H04L 67/306 |
| 2018/0052463 A1* | 2/2018 | Mays | .................. | B60W 60/007 |
| 2018/0093676 A1* | 4/2018 | Emura | ................. | G05D 1/0257 |
| 2018/0170344 A1* | 6/2018 | Laine | ...................... | B60K 6/52 |
| 2018/0181135 A1* | 6/2018 | Urano | .................. | G05D 1/0088 |
| 2018/0286242 A1* | 10/2018 | Talamonti | ............ | B62D 15/025 |
| 2018/0338229 A1* | 11/2018 | Nemec | .................... | H04W 4/40 |
| 2019/0041228 A1* | 2/2019 | Singhal | ............. | G01C 21/3484 |
| 2019/0332112 A1* | 10/2019 | Wei | ...................... | B60W 30/025 |
| 2020/0207355 A1* | 7/2020 | Ishioka | .................. | G08G 1/167 |
| 2021/0269039 A1* | 9/2021 | Kagerer | ................. | B60K 28/06 |

FOREIGN PATENT DOCUMENTS

| | | |
|---|---|---|
| DE | 10 2012 024 370 A1 | 7/2013 |
| DE | 10 2012 008 090 A1 | 10/2013 |
| DE | 10 2015 210 833 A1 | 12/2016 |
| DE | 10 2015 015 277 A1 | 6/2017 |
| DE | 102016211208 A1 * | 12/2017 |
| EP | 2 657 921 A1 | 10/2013 |
| JP | 2015-54547 A | 3/2015 |
| WO | WO 2017/138920 A1 | 8/2017 |

OTHER PUBLICATIONS

"(R) Taxonomy and Definitions for Terms Related to Driving Automation Systems for On-Road Motor Vehicles", Surface Vehicle Recommended Practice, SAE (Society of Automotive Engineering) International, J3016™, Sep. 2016, pp. 1-30 (30 pages).

International Search Report (PCT/ISA/210) issued in PCT Application No. PCT/DE2019/100578 dated Nov. 15, 2019 with English translation (five (5) pages).

German-language Written Opinion (PCT/ISA/210) issued in PCT Application No. PCT/DE2019/100578 dated Nov. 15, 2019 (six (6) pages).

German-language Search Report issued in German Application No. 10 2018 210 410.7 dated Dec. 5, 2018 with partial English translation (13 pages).

\* cited by examiner

DRIVER ASSISTANCE SYSTEM HAVING AN EMERGENCY STOPPING FUNCTION FOR A VEHICLE, VEHICLE HAVING SAID DRIVER ASSISTANCE SYSTEM, AND METHOD FOR THE EMERGENCY STOPPING OF A VEHICLE

BACKGROUND AND SUMMARY OF THE INVENTION

The present subject matter relates to a driver assistance system having an emergency stopping function for a vehicle, a vehicle having the driver assistance system, and a method for the emergency stopping of a vehicle. The present subject matter also relates to a lane change of an autonomously driving vehicle.

Driver assistance systems for (partially) autonomously driving vehicles are becoming continuously more important. For example, document DE 10 2012 001 312 A1 describes a driver assistance system in which an operator control instruction can be input by means of an input device such as a switch. If such an input takes place, a driving maneuver which can be executed autonomously can be triggered. The driver assistance system permits an emergency stop, which can be triggered by the driver or a front seat passenger, in the event of the driver becoming incapable of driving.

In the case of an autonomous emergency stop of a vehicle such as for example when a medical emergency suddenly occurs, a lane change to the edge of the roadway can take place. Such a lane change can, however, involve risks and can constitute a possible source of danger for the vehicle itself or for other road users.

An object of the present subject matter is to specify a driver assistance system having an emergency stopping function for a vehicle, a vehicle having such a driver assistance system and a method for the emergency stopping of a vehicle, which can ensure that a lane change is not critical.

According to an independent aspect of the present disclosure, a driver assistance system having an emergency stopping function for a vehicle, in particular, a motor vehicle is specified. The driver assistance system is configured to carry out an automated lane change by automated driving from a first lane to a second lane when the emergency stopping function is triggered, wherein the driver assistance system is also configured to determine at least one road characteristic and/or at least one vehicle passenger compartment characteristic, and to decide about carrying out the lane change on the basis of the determined at least one road characteristic and/or at least one vehicle passenger compartment characteristic.

The driver assistance system can decide whether the lane change is to be executed. It can be decided, for example, that the lane change to a second lane is more risky than stopping on the first lane. In such a case, it is possible not to execute a lane change and for the vehicle to be brought to a standstill on the first lane. However, if it is decided that the lane change to the second lane is less risky than stopping on the first lane, the lane change can be executed and the vehicle can be subsequently brought to a standstill on the second lane.

According to a further independent aspect of the present disclosure, a driver assistance system having an emergency stopping function for a vehicle, in particular, a motor vehicle is specified. The driver assistance system is configured to carry out a risk assessment for an autonomous or automated lane change by automated driving from a first lane to a second lane when the emergency stopping function is triggered. The driver assistance system is also configured to execute the risk assessment based on at least one road characteristic and/or one vehicle passenger compartment characteristic and to carry out the lane change only when the risk assessment is positive.

According to the present subject matter, the at least one road characteristic and/or at least one vehicle passenger compartment characteristic is used to filter out and take account of any errors in the system. The driver assistance system according to the present subject matter can execute a plausibility check, for example if a surroundings sensor system specifies that a lane change is possible. It is possible for a lane change not to take place based on the determined characteristic, and if the risk assessment is negative, even though the surroundings sensor system specifies otherwise. For example, the surroundings sensor system can indicate an adjacent lane even though one is not present or is unsuitable (e.g. a freeway entry slip lane or exit slip lane). The present subject matter can filter out this error and prevent a lane change.

The term "automated driving" can be understood within the scope of the document to mean driving with automated longitudinal or transverse guidance or autonomous driving with automated longitudinal and transverse guidance. The automated driving may be, for example, driving for a longer time on a freeway or driving for a limited time within the scope of a parking process or maneuvering process. The term "automated driving" comprises automated driving with any degree of automation.

Exemplary degrees of automation are assisted, partially automated, highly automated or fully automated driving. These degrees of automation have been defined by the Bundesanstalt für Straßenwesen (BASt) [Federal Highway Research Institute] (see BASt publication "Forschung kompakt" ["Research News"], issue 11/2012). During assisted driving, the driver continuously carries out the longitudinal or transverse guidance while the system performs the respective other function within certain limits. In the case of partially automated driving (TAF), the system performs the longitudinal and transverse guidance for a certain time period and/or in specific situations, wherein the driver has to continuously monitor the system as in the case of assisted driving. In the case of highly automated driving (HAF), the system performs the longitudinal and transverse guidance for a certain time period without the driver having to continuously monitor the system; however, the driver does have to be able to assume the guidance of the vehicle within a certain time. In the case of fully automated driving (VAF), the system can automatically perform the driving in all situations for a specific application situation, and a driver is no longer necessary for this application situation. The abovementioned four degrees of automation correspond to SAE Levels 1 to 4 of the SAE standard J3016 (SAE—Society of Automotive Engineering). For example, highly automated driving (HAF) corresponds to Level 3 of the SAE standard J3016. In addition, in SAE J3016, the SAE Level 5 is also provided as the highest degree of automation which is not included in the definition of the BASt. SAE Level 5 corresponds to driverless driving during which the system can automatically deal with all situations like a human driver during the entire journey; a driver is generally no longer required.

According to the present disclosure, a positive risk assessment signifies a minimum or acceptable risk for a lane change, in particular in comparison with stopping on a lane which is currently being traveled on. Correspondingly, a negative risk assessment signifies an increased or unacceptable risk for a lane change. The minimum or acceptable risk can depend here on a multiplicity of factors and can be defined individually for specific situations within the scope of the development of the vehicle, for example.

The driver assistance system is preferably configured to carry out an emergency stop on the first lane if the risk assessment is negative. In other words, the vehicle can brake without a lane change on the lane on which it is currently located and execute an emergency stop. In particular, in the case of a negative risk assessment it is possible to conclude that an emergency stop on the vehicle's own lane is less risky than a lane change to the adjacent lane.

In some embodiments, the first lane is a traffic lane and the second lane is a breakdown lane. The driver assistance system can be configured to carry out an emergency stop on the breakdown lane after the lane change to the breakdown lane. In further embodiments, both the first and the second lanes are traffic lanes. The driver assistance system can be configured to carry out two or more lane changes. In particular, as many lane changes can be carried out as are necessary to arrive in the breakdown lane.

The risk assessment is preferably positive if the at least one road characteristic and/or the at least one vehicle passenger compartment characteristic is present. In another example, the risk assessment is positive if the at least one road characteristic and/or the at least one vehicle passenger compartment characteristic are not present. Two or more characteristics can be used for the risk assessment. In this context, the risk assessment can be positive if all the characteristics are present or all the characteristics are not present. However, the risk assessment may also be positive if one or more characteristics are present and one or more further characteristics are not present. This can be defined suitably according to the situation, vehicle properties etc.

In some embodiments, the at least one road characteristic which can be a structural characteristic is selected from the group which comprises the following:
  a structural separation, in particular between the vehicle's own roadway and an oncoming roadway and/or
  a number of lanes and/or
  a permitted speed, in particular a speed limit and/or upcoming routing of the road, in particular a bend and/or
  a node point, in particular a roundabout, an intersection and a toll gate and/or
  a freeway entry slip lane and freeway exit slip lane.

Taking into account the structural separation between the vehicle's own roadway and an oncoming roadway can ensure, for example, that a collision cannot take place with the oncoming traffic. In particular, in the case of left-hand traffic, collisions could occur with the oncoming traffic if a lane change to the right were to be executed on the erroneous assumption of right-hand traffic. For example, the surroundings sensor system can specify that there is a lane present directly to the right of the vehicle. If a structural separation is present directly to the left of the vehicle, derived, for example, from map data of a navigation system and/or surroundings data of the surroundings sensor system, the assumption of right-hand traffic can be confirmed and the risk assessment can be positive (at least with respect to this characteristic).

The use of the number of lanes, and in particular of the traffic lanes, in the risk assessment can ensure that a lane change does not take place onto a lane which is not present or for example onto a slip lane. The risk assessment (at least with respect to this characteristic) can be positive if the number of lanes is equal to or higher than 2. The number of lanes may be, for example, derived from map data of the navigation system or backend data (e.g. cumulated data from other road users). For example, the surroundings sensor system can specify that there is a lane present directly to the right of the vehicle. If the determined number of lanes is 1, it can be inferred that the detected adjacent lane is not present or is a slip lane, for example, and is therefore not suitable for a lane change.

Taking into account the permitted speed and, in particular, a speed limit can exclude roadworks, for example. For example, the surroundings sensor system can be configured to detect speed (e.g. Speed Limit Info, SLI, from BMW). If the detected speed is higher than a (predetermined) threshold value, the risk assessment may be positive (at least with respect to this characteristic). In particular, when there is a sufficiently high permitted speed it can be inferred that roadworks are not present.

Taking into account the routing of the road ahead, in particular bends, can minimize a risk of a lane change. If, for example, it is detected by means of the navigation system or the surroundings sensor system (e.g. a camera), that the routing of the section of road is essentially straight or that there are no bends or no excessively curved bends on the present section of road, the risk assessment may be positive (at least with respect to this characteristic). Additionally or alternatively, a speed of the vehicle can be adapted and, in particular, reduced if a bend is detected. By taking into account the speed, the risk assessment can also be positive when there are bends present on the course of the road lying ahead. In particular, it is possible to avoid the vehicle driving into the bend at an excessively high speed, as a result of which a lane change may be non-critical even in bends.

The presence of node points, and in particular roundabouts, intersections and toll gates and/or of freeway entry slip lanes and freeway exit slip lanes can bring about a negative risk assessment. The node points and/or the freeway entry slip lanes and freeway exit slip lanes can be derived from map data of the navigation system and/or surroundings data of the surroundings sensor system. When node points, freeway entry slip lanes and freeway exit slip lanes are present it is possible to infer that a lane change is too risky. This may apply, for example, even if the surroundings sensor system indicates an adjacent lane.

The vehicle, and in particular the driver assistance system, typically comprises the surroundings sensor system. The surroundings sensor system can comprise at least one surroundings sensor such as, for example, a LiDAR system, one or more radar systems and/or one or more cameras. The surroundings sensor system can be used to detect lanes and, in particular, adjacent lanes of the vehicle. Additionally or alternatively, the surroundings sensor system can be used to detect the at least one road characteristic which can be a structural characteristic. In particular, the surroundings sensor system can be configured to detect the node points, in particular roundabouts, intersections and toll gates and/or the freeway entry slip lanes and freeway exit slip lanes. In some embodiments, in addition to or as an alternative to the surroundings sensor system, map data of the navigation system are used to detect the node points, in particular, roundabouts, intersections and toll gates and/or the freeway entry slip lanes and freeway exit slip lanes.

At least one vehicle passenger compartment characteristic preferably comprises the presence of a driver in the passenger compartment of the vehicle. In particular, according to a further independent aspect of the present disclosure, which can be combined with the other aspects described here, a driver assistance system is specified which is configured to detect the presence of the driver in the passenger compartment of the vehicle and, when the emergency stopping function is triggered, to carry out an autonomous lane change from a first lane to a second lane if it is detected that the driver is present. The driver assistance system is preferably configured to carry out an emergency stop on the first lane if it is detected that the driver is not present.

When there is a suspicion that the driver is absent, an immediate emergency stop can be carried out. For example, the driver may intentionally or unintentionally have left the vehicle during the journey. In such a situation it may be less risky to stop on the vehicle's own lane without a lane change. For example, by stopping on the vehicle's own lane with optional light signaling (e.g. flashing warning lights) the traffic behind can be alerted to a critical situation. It is therefore possible to prevent the driver who is located, for example, on the roadway behind the vehicle, from being injured by traffic traveling behind.

The vehicle, and in particular, the driver assistance system, typically comprise a passenger compartment sensor system. The passenger compartment sensor system can comprise at least one passenger compartment sensor such as, for example, one or more cameras for capturing the passenger compartment and, in particular, detecting the presence of the driver. The present disclosure is, however, not limited to cameras and other sensors, such as, for example, (weight) sensors can also be used for detecting whether the driver's seat is occupied. Additionally or alternatively it is possible to determine, on the basis of a state of a seatbelt lock and/or a door lock, whether the driver remains in the vehicle or has left the vehicle.

According to a further independent aspect of the present disclosure which can be combined with the other aspects described here, a driver assistance system with an emergency stopping function for a vehicle is specified, which system is configured to detect the presence of a driver in the passenger compartment of the vehicle and to carry out an emergency stop on a lane which is currently being traveled on, if it is detected that the driver is not present.

In some embodiments, the driver assistance system comprises an operator electronic control unit for the triggering of the emergency stopping function by a driver or a front seat passenger. The operator electronic control unit can also serve to activate a vehicle function which is separate from the emergency stopping function. There can therefore be at least one double assignment of the operator electronic control unit for activating two different functions. For example, the vehicle comprises an electric parking brake and a parking brake operator electronic control unit for activating the electric parking brake in the stationary state. The activation of the parking brake corresponds in this case to the actuation of a separate vehicle function. The parking brake operator electronic control unit is also used in this case as an operator electronic control unit for triggering the emergency stopping function. It is advantageous here if the driver assistance system is configured to activate the emergency stopping function only in reaction to the ending of the activation of the parking brake operator electronic control unit.

According to a further aspect of the present disclosure, a vehicle is specified comprising the driver assistance system according to the embodiments of the present disclosure. The term vehicle comprises passenger cars, trucks, buses, camper vans, motorcycles etc. which serve to convey passengers, goods etc. The term comprises motor vehicles for passenger transportation.

According to a further independent aspect of the present disclosure, a method for the emergency stopping of a vehicle is specified. The method comprises determining at least one road characteristic and/or at least one vehicle passenger compartment characteristic and deciding about executing an autonomous or automated lane change from a first lane to a second lane based on the determined at least one road characteristic and/or at least one vehicle passenger compartment characteristic.

According to a further independent aspect of the present disclosure, a method for the emergency stopping of a vehicle is specified. The method comprises determining at least one road characteristic and/or at least one vehicle passenger compartment characteristic, executing a risk assessment based on the at least one road characteristic and/or at least one vehicle passenger compartment characteristic and executing an autonomous or automated lane change from a first lane to a second lane if the risk assessment is positive. After the lane change, the vehicle can carry out an emergency stop on the second lane and come to a standstill.

According to a further independent aspect of the present disclosure which can be combined with the other aspects described here, a method for the emergency stopping of a vehicle is specified. The method comprises detecting the presence of a driver in the passenger compartment of the vehicle and executing an autonomous or automated lane change from a first lane to a second lane if it is detected that the driver is present. After the lane change, the vehicle can carry out an emergency stop on the second lane and come to a standstill.

According to a further independent aspect of the present disclosure, which can be combined with the other aspects described here, a method for the emergency stopping of a vehicle is specified. The method comprises detecting the presence of a driver in the passenger compartment of the vehicle and executing an emergency stop on a lane which is currently being traveled on, if it is detected that the driver is not present.

The method can be implemented by means of the driver assistance system in the present disclosure. In addition, the method can contain or carry out the aspects described with respect to the driver assistance system.

DETAILED DESCRIPTION OF THE DRAWINGS

In the text which follows, unless stated otherwise identical reference symbols are used for identical and identically acting elements.

Figure 1:
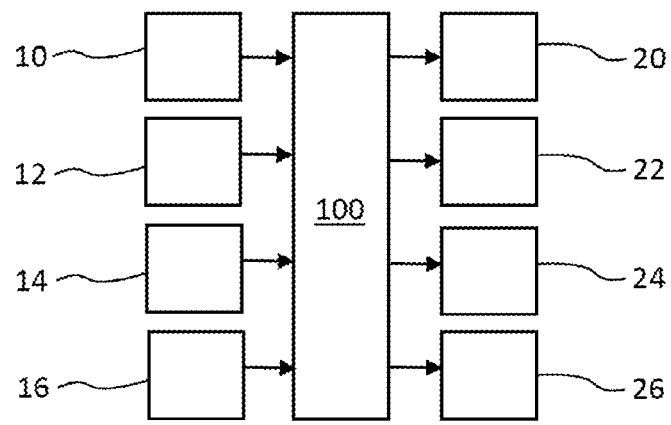
FIG. 1 shows a schematic view of a driver assistance system having an emergency stopping function for a vehicle according to an embodiment of the present disclosure.

FIG. 1 shows a schematic view of a driver assistance system 100 having an emergency stopping function for a vehicle according to embodiments of the present disclosure. The driver assistance system 100 can also be referred to as an "emergency stopping assistance system".

An emergency stopping function of the driver assistance system 100 is typically activated as a function of the activation of an operator electronic control unit 10, within the scope of which the vehicle then executes an autonomous emergency stopping driving maneuver for the emergency stopping of the vehicle on the breakdown lane. The operator electronic control unit 10 can be, for example, a parking brake operator electronic control unit for activating the electric parking brake in a stationary state. There can therefore be at least one double assignment of the operator electronic control unit 10 for activating two different functions.

If the emergency stop is triggered by a driver or front seat passenger, the driver assistance system 100 carries out an emergency stopping driving maneuver. In such an autonomous or automated emergency stopping driving maneuver the longitudinal and transverse guidance of the vehicle take place automatically. The driver assistance system 100 therefore performs the guidance of the vehicle until the vehicle is brought to a standstill. For this purpose, the driver assistance system 100 controls the drive 20, the transmission 22, the hydraulic service brake 24 and the steering 26 via intermediate elements (not illustrated).

To plan and execute the emergency stopping driving maneuver, surroundings information from a surroundings sensor system which observes the surroundings of the vehicle is extracted by the driver assistance system 100. In particular, the vehicle can comprise at least one surroundings sensor 12 which is configured to pick up surroundings data that specify the surroundings of the vehicle. The at least one surroundings sensor 12 can comprise, for example, a LiDAR system, one or more radar systems and/or one or more cameras.

In some embodiments, the vehicle can comprise a navigation system and/or a backend connection 14. The map data of the navigation system or online data of the backend connection can be used in the risk assessment for executing the emergency stopping maneuver. For example, the map data and/or backend data can be used for a plausibility check of a lane change. It is therefore possible to confirm by means of the map data and/or backend data, for example on the basis of the presence of a structural separation between the vehicle's own roadway and the oncoming roadway, that the vehicle is located on a road with right-hand traffic, and a collision with oncoming traffic does not occur when there is a lane change onto a traffic lane which is located directly to the right of the vehicle.

According to some embodiments, the vehicle comprises a passenger compartment sensor system. The passenger compartment sensor system can comprise at least one passenger compartment sensor 16 such as, for example, one or more cameras, for capturing the passenger compartment, and in particular, detecting the presence of the driver. The present disclosure is, however, not limited to cameras and other sensors such as, for example, (weight) sensors can also be used for detecting whether the driver's seat is occupied. Additionally or alternatively, it is possible to determine on the basis of a state of a seatback lock and/or of a door lock whether the driver remains in the vehicle or has left the vehicle.

The passenger compartment sensor system can be used to detect whether the driver is still in the vehicle. If it is detected that the driver is no longer in the vehicle, the emergency stopping maneuver can be executed on the traffic lane which is currently being traveled on. Such an emergency stopping maneuver can be triggered in some embodiments without activating the operator electronic control unit 10. In other words, the emergency stopping maneuver can be carried out automatically if it is determined that the driver is no longer in the vehicle.

Figure 2:
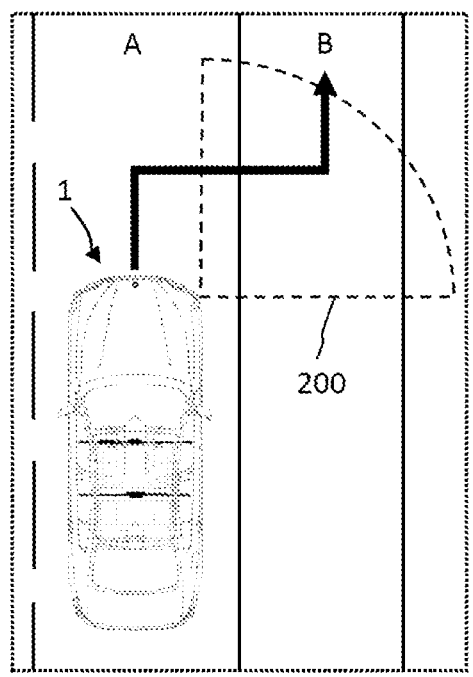
FIG. 2 shows a lane change according to an embodiment of the present disclosure.

FIG. 2 shows a lane change in the case of an emergency stopping maneuver according to embodiments of the present disclosure. In FIG. 2, the lane change occurs from a first lane ("vehicle's own lane") to a second lane ("adjacent lane"), wherein the first lane is a traffic lane A, and the second lane is a breakdown lane B. After the lane change, the vehicle 1 is braked on the breakdown lane B and brought to a standstill.

According to embodiments, the vehicle 1 comprises the surroundings sensor system which is configured to pick up surroundings data in a monitoring area 200. The acquired surroundings data can be evaluated to determine whether there is an adjacent lane onto which a lane change can take place.

The driver assistance system is configured to execute a lane change based on at least one road characteristic and/or at least one vehicle passenger compartment characteristic. In particular, the driver assistance system is configured to execute a risk assessment on the basis of at least one road characteristic and/or at least one vehicle passenger compartment characteristic, and to carry out the lane change only when the risk assessment is positive. The risk assessment is executed to filter out or take into account any errors in the system. The driver assistance system can execute plausibility checking, for example, if a surroundings sensor system specifies that a lane change is possible. If the risk assessment is negative, a lane change cannot occur even though the surroundings sensor system specifies otherwise. For example, the surroundings sensor system can indicate an adjacent lane even though one is not present or the lane is unsuitable (e.g. a freeway entry slip lane or exit slip lane).

Based on the risk assessment, either an emergency stop occurs on the traffic lane A or a lane change occurs to the breakdown lane B with subsequent stopping of the vehicle 1 on the breakdown lane B. A negative risk assessment can signify that it is riskier to stop on the traffic lane A than to change to the assumed breakdown lane. In contrast to this, a positive risk assessment can signify that it is less risky to change to the breakdown lane B than to stop on the traffic lane A.

For example, the lane change cannot take place if the lane adjacent to the traffic lane is not a breakdown lane but rather, for example, a freeway entry slip lane or a freeway exit slip lane. The presence of a freeway entry slip lane or freeway exit slip lane can be derived, for example, from map data of a navigation system of the vehicle 1. The map data can be used in combination with the surroundings data of the surroundings sensor system to execute the risk assessment.

In another example, the lane change cannot take place and the vehicle can be brought to a standstill on its own lane if, for example, it is detected by means of the passenger compartment sensor system that the driver is no longer in the vehicle 1.

Although a single lane change is shown by way of example in FIG. 2, when the emergency stopping function is triggered, the driver assistance system can execute two or more lane changes (e.g. three lane changes). Here, a renewed risk assessment can take place for each lane change. Therefore, the driver assistance system can execute, for example, a first risk assessment for a first lane change from a first traffic lane to a second traffic lane. If the first risk assessment is positive, the lane change from the first traffic lane to the second traffic lane can take place. Subsequently, the driver assistance system can execute a second risk assessment for a second lane change from the second traffic lane to the breakdown lane. If the second risk assessment is positive, the lane change from the second traffic lane to the breakdown lane can take place.

Figure 3:
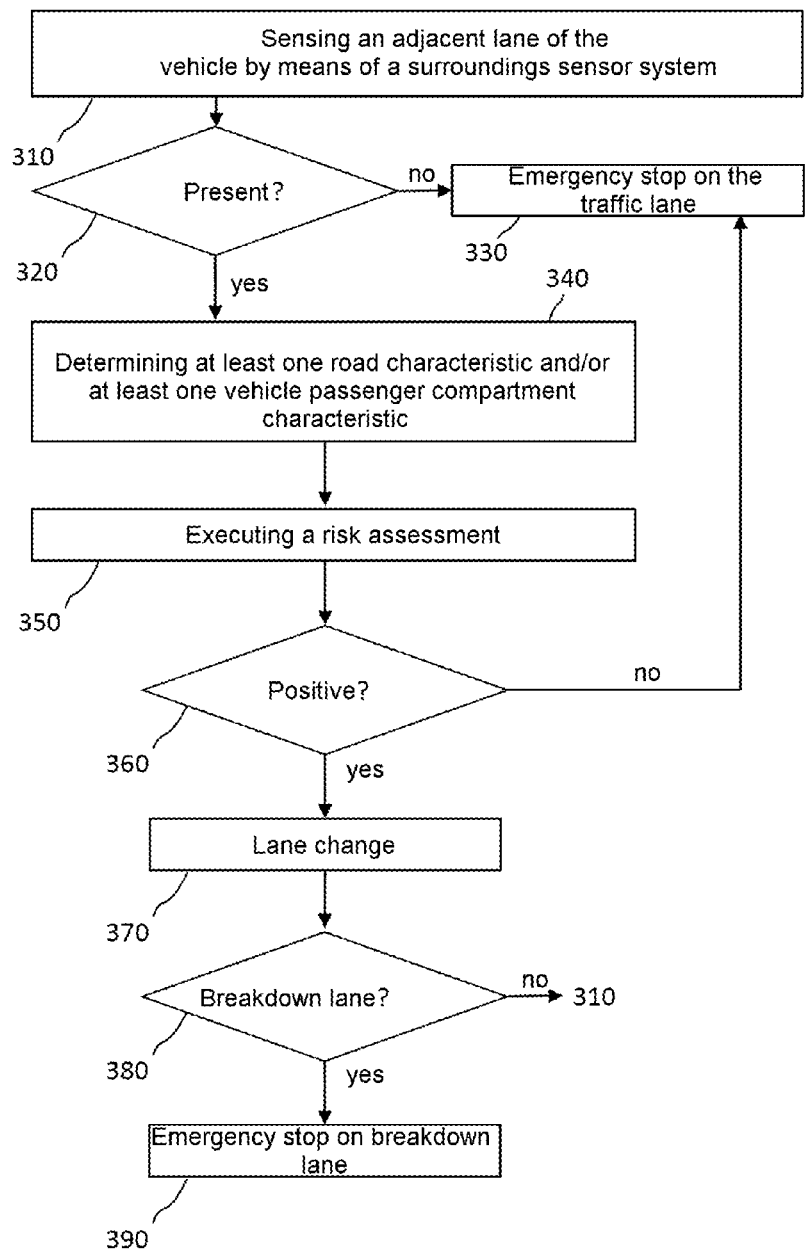
FIG. 3 shows a flow diagram of a method for the emergency stopping of a vehicle according to an embodiment of the present disclosure.

FIG. 3 shows a flow diagram of a method 300 for the emergency stopping of a vehicle according to embodiments of the present disclosure.

The method 300 comprises in block 310 the sensing of an adjacent lane of the vehicle by a surroundings sensor system. The surroundings sensor system can provide surroundings data of the vehicle, to determine whether next to the vehicle there is a potential lane onto which a lane change can be executed and a subsequent emergency stop to a standstill can be carried out (block 320).

In block 330, an emergency stop is executed without a lane change, on the lane on which the vehicle is currently located, if it is determined in block 320 that there is no lane next to the traffic lane. For example, it can be sensed that next to the vehicle there is a structural boundary such as, for example, a wall or a guardrail. In such a case, there is no suitable lane next to the vehicle upon which the vehicle can be safely brought to a standstill.

If it is determined in block 320 that there is a potential adjacent lane, such as for example a breakdown lane, for a lane change, a risk assessment takes place to determine whether the lane change is plausible and less risky than stopping on the current traffic lane. In particular, in block 340, at least one road characteristic and/or at least one vehicle passenger compartment characteristic are/is determined. The at least one road characteristic can be determined, for example, by means of the surroundings sensor system and/or the navigation system. The at least one vehicle passenger compartment characteristic can be determined, for example, by means of the passenger compartment sensor system.

In block 350, a risk assessment takes place using the at least one road characteristic and/or the at least one vehicle passenger compartment characteristic. If the risk assessment has a positive result, a lane change is carried out in block 370. If the risk assessment has a negative result, an emergency stop on the lane which is currently being traveled on is carried out in block 330 without a lane change.

In block 380 it is determined whether the lane on which the lane change has taken place is a breakdown lane. If the lane is a breakdown lane, an emergency stop is carried out and the vehicle is brought to a standstill. If the lane is not a breakdown lane (e.g. is a further traffic lane), a renewed risk assessment is executed. In some embodiments, lane changes can be executed with respective risk assessments until the vehicle reaches the breakdown lane.

The at least one road characteristic can comprise a structural separation between the vehicle's own roadway and an oncoming roadway, a number of lanes, a permitted speed, an upcoming routing of the road, node points and/or freeway entry slip lanes and freeway exit slip lanes. The at least one vehicle passenger compartment characteristic can comprise the presence of a driver in the passenger compartment of the vehicle.

In some embodiments, one or more further characteristics can be used for the risk assessment, such as for example a variable which is characteristic of a current traffic volume. The variable which is characteristic of a current traffic volume can comprise, for example, a traffic density and/or traffic intensity.

According to the present subject matter, the at least one road characteristic and/or at least one vehicle passenger compartment characteristic is used to filter out or take into account any errors in the system. The driver assistance system according to the present subject matter can execute plausibility checking, for example if a surroundings sensor system specifies that a lane change is possible. Based on the determined characteristic and, in particular, if the risk assessment is negative, a lane change cannot occur even though the surroundings sensor system specifies otherwise. For example, the surroundings sensor system can indicate an adjacent lane even though one is not present or the lane is unsuitable (e.g. a freeway entry slip lane or exit slip lane). The present subject matter can filter this error and prevent a lane change.

What is claimed is:

1. A driver assistance system having an emergency stopping function for a vehicle, wherein the driver assistance system is configured to:
   execute an automated lane change from a first lane to a second lane in response to the emergency stopping function being triggered;
   determine, using one or more sensors, a speed limit and/or at least one vehicle passenger compartment characteristic;
   execute the lane change based on the determined speed limit being higher than a threshold value and/or at least one vehicle passenger compartment characteristic;
   execute a risk assessment for the automated lane change based on the determined speed limit and/or at least one vehicle passenger compartment characteristic; and
   execute the lane change if the risk assessment is positive.

2. The driver assistance system according to claim 1, wherein
   the driver assistance system is further configured to:
      not execute the lane change if surroundings data detected by the one or more sensors indicates that the second lane is present and the risk assessment is negative.

3. The driver assistance system according to claim 1, wherein
   the executed lane change is further based on a road characteristic selected from at least one of:
      a structural separation between the vehicle's own roadway and an oncoming roadway;
      a number of lanes;
      an upcoming routing or bend of the road;
      a roundabout;
      an intersection;
      a toll gate;
      a freeway entry slip lane; or
      a freeway exit slip lane.

4. The driver assistance system according to claim 1, wherein
   the at least one vehicle passenger compartment characteristic comprises a presence of a driver in a passenger compartment of the vehicle.

5. A motor vehicle comprising the driver assistance system according to claim 1.

6. A driver assistance system having an emergency stopping function for a vehicle, wherein the driver assistance system is configured to:
   execute an automated lane change from a first lane to a second lane in response to the emergency stopping function being triggered;
   determine, using one or more sensors, a speed limit and/or at least one vehicle passenger compartment characteristic;
   execute the lane change based on the determined speed limit being higher than a threshold value and/or at least one vehicle passenger compartment characteristic; and execute the emergency stopping function in the first lane based on a determination that a lane change is not to be executed based on the determined speed limit and/or the at least one vehicle passenger compartment characteristic;

execute a risk assessment for the automated lane change based on the determined speed limit and/or the at least one vehicle passenger compartment characteristic; and execute the lane change based on the risk assessment.

7. A driver assistance system having an emergency stopping function for a vehicle, wherein the driver assistance system is configured to:

execute an automated lane change from a first lane to a second lane in response to the emergency stopping function being triggered;

determine, using one or more sensors, a speed limit and/or at least one vehicle passenger compartment characteristic;

execute the lane change based on the determined speed limit being higher than a threshold value and/or at least one vehicle passenger compartment characteristic;

detect a presence of a driver in a passenger compartment of the vehicle;

when the emergency stopping function is triggered, execute the automated lane change from the first lane to the second lane based on the detected presence of the driver; and execute the emergency stopping function in the first lane if it is detected that the driver is not present.

8. A method for performing an emergency stop of a vehicle, comprising:

determining, using one or more sensors, a speed limit and/or at least one vehicle passenger compartment characteristic;

executing an automated lane change from a first lane to a second lane based on the determined speed limit being higher than a threshold value and/or at least one vehicle passenger compartment characteristic;

executing a risk assessment for the automated lane change based on the determined speed limit and/or at least one vehicle passenger compartment characteristic; and executing the lane change if the risk assessment is positive.

9. The method according to claim 8, further comprising:
not executing the lane change if surroundings data of the one or more sensors indicates that the second lane is present and the risk assessment is negative.

10. The method according to claim 8, wherein
the executed lane change is further based on a road characteristic selected from at least one of:
a structural separation between the vehicle's own roadway and an oncoming roadway;
a number of lanes;
an upcoming routing or bend of the road;
a roundabout;
an intersection;
a toll gate;
a freeway entry slip lane; or
a freeway exit slip lane.

11. The method according to claim 8, wherein
the at least one vehicle passenger compartment characteristic comprises a presence of a driver in a passenger compartment of the vehicle.

12. A method for performing an emergency stop of a vehicle, comprising:

determining, using one or more sensors, a speed limit and/or at least one vehicle passenger compartment characteristic;

executing an automated lane change from a first lane to a second lane based on the determined speed limit being higher than a threshold value and/or at least one vehicle passenger compartment characteristic;

executing the emergency stop in the first lane based on a determination that the lane change is not to be executed based on the determined speed limit and/or the at least one vehicle passenger compartment characteristic;

executing a risk assessment for the automated lane change based on the determined speed limit and/or the at least one vehicle passenger compartment characteristic; and executing the lane change based on the risk assessment.

13. A method for performing an emergency stop of a vehicle, comprising:

determining, using one or more sensors, a speed limit and/or at least one vehicle passenger compartment characteristic;

executing an automated lane change from a first lane to a second lane based on the determined speed limit being higher than a threshold value and/or at least one vehicle passenger compartment characteristic;

detecting presence of a driver in a passenger compartment of the vehicle;

when the emergency stop is triggered, executing the automated lane change from the first lane to the second lane based on the detected presence of the driver; and executing the emergency stop in the first lane if it is detected that the driver is not present.

* * * * *